US006847333B2

(12) United States Patent
Bokhour (10) Patent No.: US 6,847,333 B2
(45) Date of Patent: Jan. 25, 2005

(54) METHOD OF AND SYSTEM FOR LOW-BANDWIDTH TRANSMISSION OF COLOR VIDEO

(76) Inventor: Edward Bokhour, 67 Crest St., Concord, MA (US) 01742

(*) Notice: Subject to any disclaimer, the term of this patent is extended or adjusted under 35 U.S.C. 154(b) by 655 days.

(21) Appl. No.: 09/977,420

(22) Filed: Oct. 15, 2001

(65) Prior Publication Data

US 2002/0048398 A1 Apr. 25, 2002

Related U.S. Application Data

(60) Provisional application No. 60/240,222, filed on Oct. 13, 2000.

(51) Int. Cl.[7] .............................................. G09G 5/00
(52) U.S. Cl. ........................ 345/1.1; 345/593; 345/589; 358/518
(58) Field of Search .......................... 345/1.1, 2.1, 589, 345/593, 595, 596, 600, 603, 604; 358/515, 518, 521, 525

(56) References Cited

U.S. PATENT DOCUMENTS

| | | | | |
|---|---|---|---|---|
| 4,829,385 A | * | 5/1989 | Takezawa | 358/426.12 |
| 4,922,349 A | * | 5/1990 | Abe et al. | 358/443 |
| 5,130,786 A | | 7/1992 | Murata et al. | 358/21 R |
| 5,987,169 A | | 11/1999 | Daly et al. | 382/167 |
| 6,023,558 A | * | 2/2000 | Grabowski | 358/1.9 |
| 6,201,570 B1 | | 3/2001 | Murata et al. | 348/212 |
| 6,211,917 B1 | | 4/2001 | Shyu | 348/453 |
| 6,384,836 B1 | * | 5/2002 | Naylor et al. | 345/589 |
| 6,563,517 B1 | * | 5/2003 | Bhagwat et al. | 345/35 |
| 6,778,186 B2 | * | 8/2004 | Mehigan | 345/596 |

OTHER PUBLICATIONS

International Search Report for corresponding International Application No. PCT/US01/42730.

* cited by examiner

Primary Examiner—Kent Chang
(74) Attorney, Agent, or Firm—McDermott Will & Emery LLP (57) ABSTRACT

A system for transmitting color images includes an image capture device for receiving at least one color image; a gray scale image generator for removing color data from the image to produce gray scale version of the image; a first region detection device for identifying a plurality of arbitrarily-shaped discrete regions of the image and generating a region map, wherein each of the plurality of discrete regions of the region map encompass a portion of the gray scale image having a particular intensity value (luminance) or visual texture (visually observable intensity pattern variations); a color region list compiler for compiling a color region list associating each of the plurality of regions with a color value; and a transmission device for transmitting the gray scale version of the image and the color region list. The system further includes a reception device for receiving the gray scale version of the image and the color region list; a second region detection device for identifying the plurality of arbitrarily-shaped discrete regions of the image identified by the first region detection device and generating the region map; and a color assignment device which receives the color region list and assigns a color value to each of the plurality of regions in the region map, based on information in the color region list to generate a colored region image.

31 Claims, 4 Drawing Sheets

METHOD OF AND SYSTEM FOR LOW-BANDWIDTH TRANSMISSION OF COLOR VIDEO

CROSS-REFERENCE TO RELATED APPLICATIONS

This application claims the benefit of U.S. Provisional Application Ser. No. 60/240,222, filed Oct. 13, 2000, entitled LOW BANDWIDTH COLOR REGION VIDEO TRANSMISSION.

FIELD OF THE INVENTION

The present invention relates generally to a method of and system for low-bandwidth transmission of color video and more particularly to a method and system for transmitting color video which manipulates the color image input to the system to create a received color image which is similar in quality to the input color image, but requires relatively lower bandwidth to transmit.

BACKGROUND OF THE INVENTION

Color video transmission is utilized in connection with many media forms, including cable television, the internet and for video conferencing purposes over high-speed digital transmission lines. In such cases, while the amount of bandwidth required for enabling the transmission of color video is large, the modes of transmission are typically capable of handling these bandwidth demands.

The demand for low cost video conferencing, such as for use in residences and the like, has been increasing. However, typical analog telephone lines, cellular telephone channels, and wireless links commonly used for portable devices such as Personal Digital Assistants (PDAs), are not capable of handling high-speed transmission of video in color. Accordingly, color video transmissions, if even possible, are of poor quality and can be choppy and delayed, since the color video frames cannot be transmitted over the standard channels quickly enough.

Furthermore, even where high bandwidth channels are available, the demand for fill motion color video is high enough that multiple video "streams" often need to be transmitted over the same transmission channel. In this case, a reduction of the bandwidth of each video stream will permit a higher number of channels to be transmitted, thereby increasing the effective capacity of the total system.

SUMMARY OF THE INVENTION

The present invention is directed to a method of and system for transmitting color video over low-bandwidth transmission means, including processing each video frame such that only a gray scale image and information about the colors of the image are transmitted to the receiver. The receiver, using the gray scale image and the color information, operates to colorize the image in real time, resulting in a color video display that approximates the original color input to the system.

According to one embodiment of the invention, a system for transmitting color images includes an image capture device for receiving at least one color image; a gray scale image generator for removing color data from the image to produce a gray scale version of the image; a first region detection device for identifying a plurality of arbitrarily-shaped discrete regions of the image and generating a region map, wherein each of the plurality of discrete regions of the region map encompass a portion of the gray scale image having a particular intensity value (luminance) or visual texture (visually observable intensity pattern variations); a color region list compiler for compiling a color region list associating each of the plurality of regions with a color value; and a transmission device for transmitting the gray scale version of the image and the color region list. The system further includes a reception device for receiving the gray scale version of the image and the color region list; a second region detection device for identifying the plurality of arbitrarily-shaped discrete regions of the image identified by the first region detection device and generating the region map; and a color assignment device which receives the color region list and assigns a color value to each of the plurality of regions in the region map, based on information in the color region list, to generate a colored region image.

The system may further include a camera for inputting video images into the image capture device and a compression device for receiving the gray scale version of the image and the color region list and generating a compressed signal for transmission to the reception device. In a first iteration, the first and second region detection devices may scan the gray scale image from a first point of the gray scale image to a second point of the gray scale image and generate the region map at a low resolution, and in further iterations, the first and second region detection devices scan each of the regions identified in a preceding iteration at successively higher resolutions, to identify further regions within the region map. Each region of the region map may include a unique identification index and the color region list includes the unique identification indices and an associated color value for each region. The color value associated with each region may include an average of color values included within each region. The system may further include a colored region image generator for generating a colored region image, the colored region image including the color values for each of the discrete regions and a color region linking device for linking each of the color values in the colored region image with an associated discrete region in the region map, wherein each linked color region is input to the color region list compiler. The system may further include an image summer for combining the gray scale image and the colored region image to generate a final colored image; and a display device for receiving and displaying the final colored image.

According to another embodiment of the invention, a method of transmitting color images includes:

A. receiving at least one color image;

B. removing color data from the image to produce a gray scale version of the image;

C. identifying a plurality of arbitrarily-shaped discrete regions of the gray scale image and generating a region map, wherein each of the plurality of discrete regions of the region map encompass a portion of the gray scale image having a particular intensity value (luminance) or visual texture (visually observable intensity pattern variations);

D. determining a color value in each of the plurality of regions, based on color information in the color image;

E. compiling a color region list associating each of the plurality of regions with a color value;

F. transmitting the gray scale version of the image and the color region list;

G. receiving the gray scale version of the image and the color region list;

H. identifying the plurality of arbitrarily-shaped discrete regions of the gray scale image identified by the first region detection device and generating the region map; and I. assigning a color value to each of the plurality of regions in the region map, based on information in the color region list.

The method may further include, prior to step F, compressing the gray scale version of the image and the color region list to generate a compressed signal for transmission to the reception device. In a first iteration, the first and second region detection devices may scan the gray scale image from a first point of the gray scale image to a second point of the gray scale image and generate the region map at a low resolution, and in further iterations, the first and second region detection devices scan each of the regions identified in a preceding iteration at successively higher resolutions, to identify further regions within the region map. Each region of the region map may include a unique identification index and the color region list includes the unique identification indices and an associated color value for each region. The color value associated with each region may include an average of color values included within each region. The method may further include, prior to step D, generating a colored region image, the colored region image including the color values for each of the discrete regions. The method may further include, prior to step E, linking each of the color values in the colored region image with an associated discrete region in the region map, wherein each linked color region is input to the color region list compiler. The system may further include, after step I, combining the gray scale image and the colored region image to generate a final colored image; and displaying the final colored image.

According to another embodiment, a system for transmitting color images is disclosed which includes:

an image capture device for receiving at least one color image;

a gray scale image generator for removing color data from the image to produce gray scale version of the image;

a first region detection device for identifying a plurality of arbitrarily-shaped discrete regions of the image and generating a region map, wherein each of the plurality of discrete regions of the region map encompass a portion of the gray scale image having a particular luminance value;

a color region list compiler for compiling a color region list associating each of the plurality of regions with a color value;

a transmission device for transmitting the gray scale version of the image and the color region list;

a reception device for receiving the gray scale version of the image and the color region list;

a second region detection device for identifying the plurality of arbitrarily-shaped discrete regions of the image identified by the first region detection device and generating the region map; and a color assignment device which receives the color region list and assigns a color value to each of the plurality of regions in the region map, based on information in the color region list to generate a colored region image.

According to another aspect of the invention, a system for transmitting color images is disclosed which includes:

an image capture device for receiving at least one color image;

a gray scale image generator for removing color data from the image to produce gray scale version of the image;

a first region detection device for identifying a plurality of arbitrarily-shaped discrete regions of the image and generating a region map, wherein each of the plurality of discrete regions of the region map encompass a portion of the gray scale image having a particular textural value;

a color region list compiler for compiling a color region list associating each of the plurality of regions with a color value;

a transmission device for transmitting the gray scale version of the image and the color region list;

a reception device for receiving the gray scale version of the image and the color region list;

a second region detection device for identifying the plurality of arbitrarily-shaped discrete regions of the image identified by the first region detection device and generating the region map; and a color assignment device which receives the color region list and assigns a color value to each of the plurality of regions in the region map, based on information in the color region list to generate a colored region image.

According to another aspect of the invention, a system for transmitting color images is disclosed which includes:

an image capture device for receiving at least one color image;

a gray scale image generator for removing color data from the image to produce gray scale version of the image;

a first region detection device for identifying a plurality of arbitrarily-shaped discrete regions of the image and generating a region map, wherein each of the plurality of discrete regions of the region map encompass a portion of the gray scale image having a particular common value;

a colored region image generator for generating a colored region image, the colored region image including color values for each of the discrete regions;

a color region list compiler for compiling a color region list associating each of the plurality of regions with the color values;

a transmission device for transmitting the gray scale version of the image and the color region list;

a reception device for receiving the gray scale version of the image and the color region list;

a second region detection device for identifying the plurality of arbitrarily-shaped discrete regions of the image identified by the first region detection device and generating the region map; and a color assignment device which receives the color region list and assigns a color value to each of the plurality of regions in the region map, based on information in the color region list to generate a colored region image.

The particular common value may be one of a luminance value of the region and a textural value of the region.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

Generally, the present invention includes a camera for obtaining video of a subject, a transmission device including a first image processing system and a receiver device including a second image processing system. The first image processing system converts each incoming color image into a gray scale image and generates a color region list that includes color information about the associated incoming color image. The second image processing system receives the gray scale image and the color information and reconstructs the original color image for viewing. The system processes each frame of the video in real time, thus enabling fast color video transmission on low bandwidth transmission lines.

Figure 1:
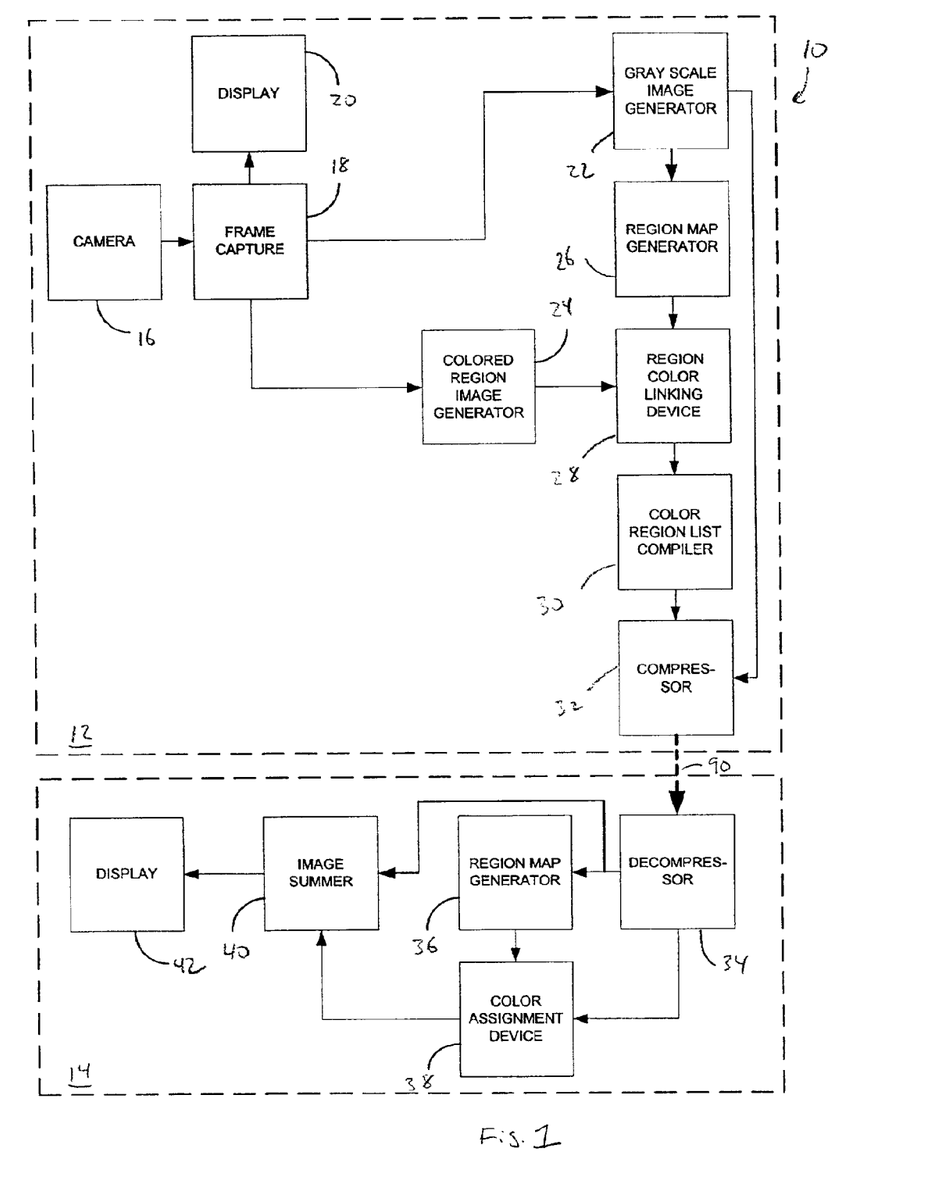
FIG. 1 is a schematic block diagram of the system for low bandwidth color video transmission in accordance with the present invention.
Figure 2:
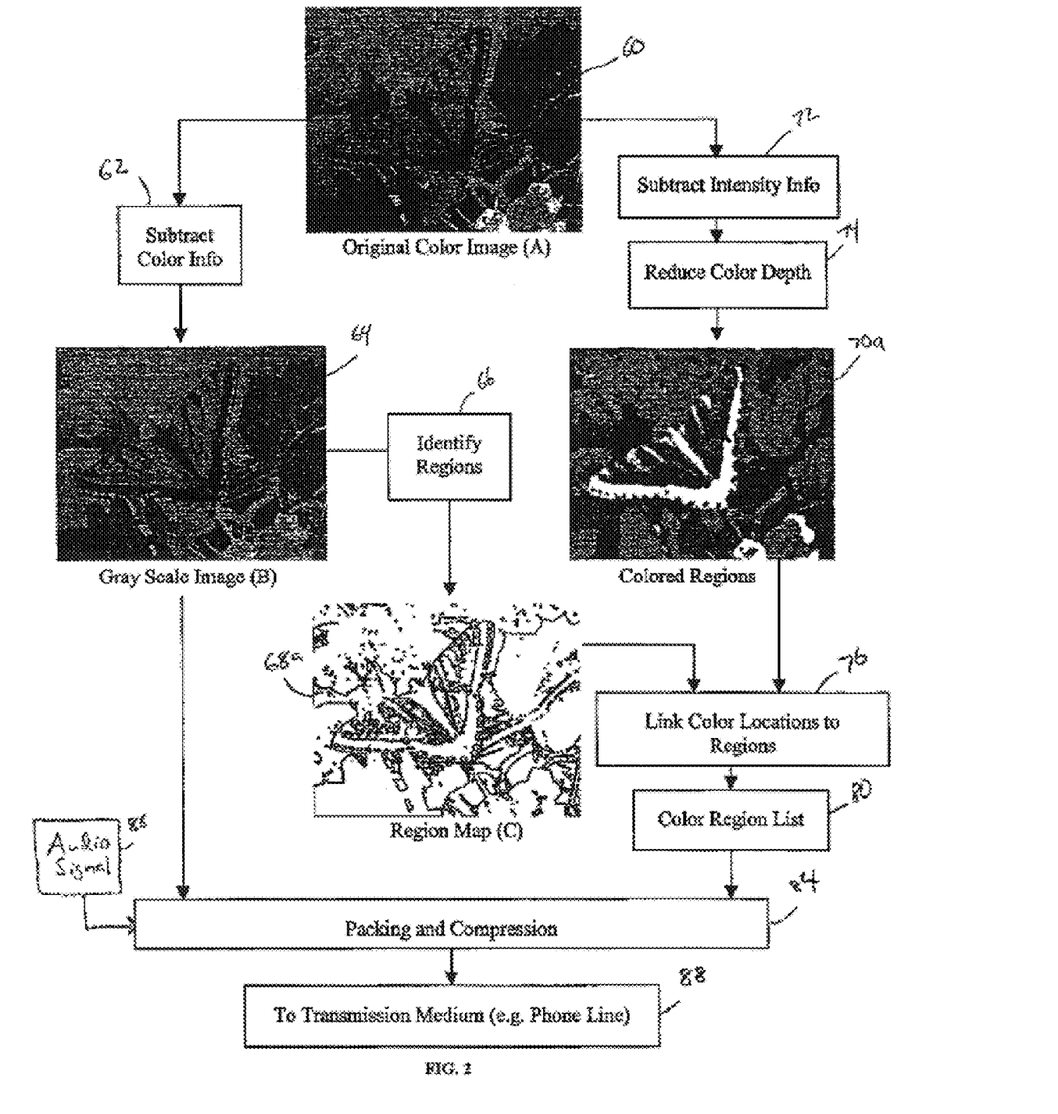
FIG. 2 is a schematic flow diagram of the method of transmitting low bandwidth color video in accordance with the present invention.
Figure 3:
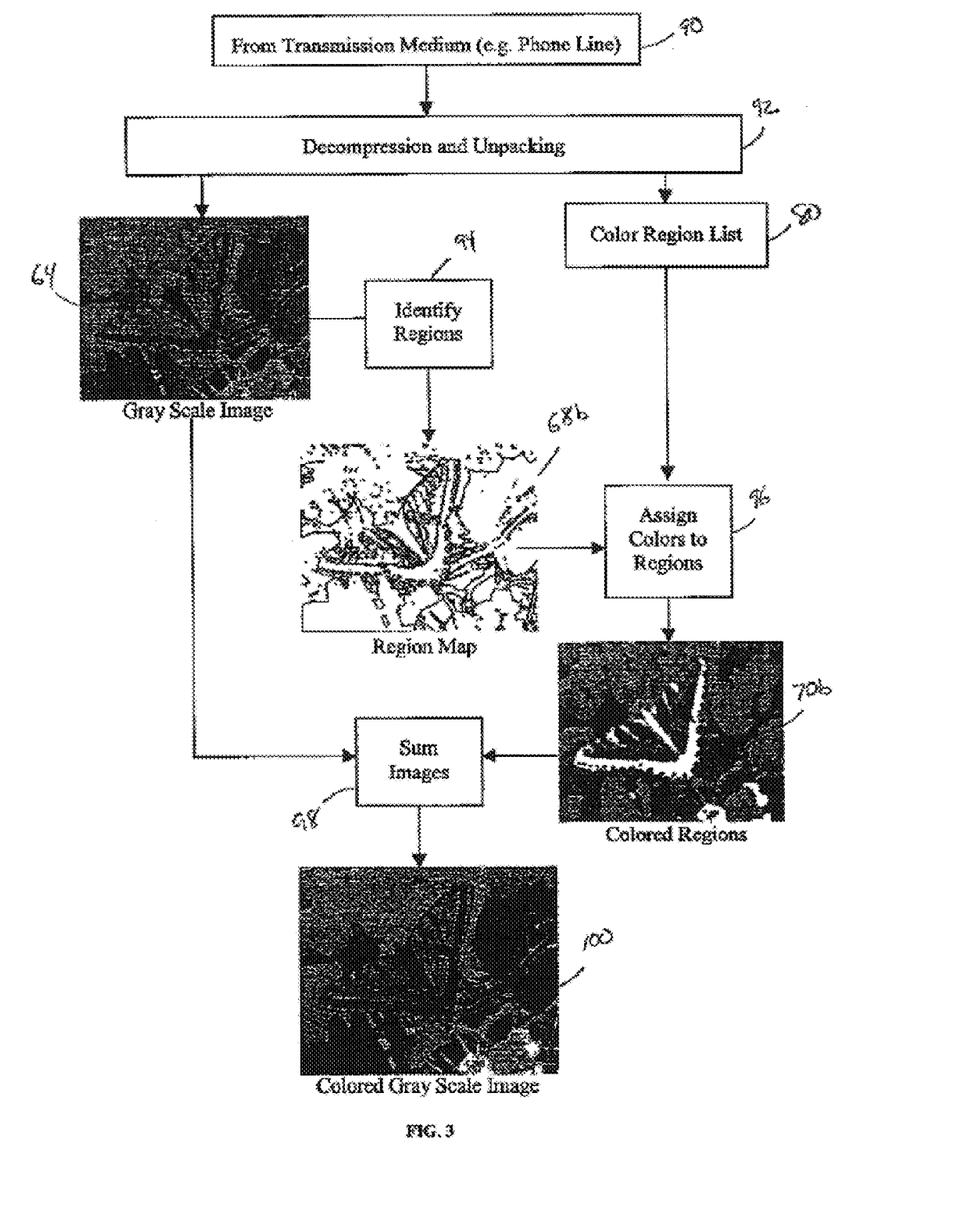
FIG. 3 is a schematic flow diagram of the method of receiving and displaying low bandwidth color video in accordance with the present invention.

FIG. 1 is a schematic block diagram of the system 10 for transmitting color video over low-bandwidth transmission means. System 10 includes video capture, processing and transmission device 12 and video reception, processing and display device 14. FIG. 2 is a flow diagram showing the method of processing and transmitting color video carried out by transmission device 12 and FIG. 3 is a flow diagram showing the method of processing and displaying the received color video carried out by reception device 14.

Transmission device 12 includes a camera 16, which is preferably a miniature CCD device. Camera 16 receives a video input, which is input to video capture device 18. Each frame is captured by frame capture device 18 and input to a display device 20, such as a low resolution LCD monitor. Frame capture device 18 is capable of processing a minimum of 20 frames per second, and preferably 30 frames per second. An example of a single frame original color image captured by video capture device 18 from the video signal received by camera 16 is shown at 60 in FIG. 2. Original color image 60 is then input to gray scale image generation device 22 and color region image generator 24.

Gray scale image generator 22 processes the original color image 60 by first subtracting the color information from the original color image, step 62, resulting in gray scale image 64, which is represented by at least 8 bits, and preferably 16 bits. The gray scale image 64 is input to region map generator 26, step 66, which generates a region map 68a. Region map 68a is generated by scanning the gray scale image 64, starting from a predetermined location, such as the top left corner or at the center of the image, and finishing at a different predetermined location. The order in which the image is processed is important since, as described below, the reception device 14 will scan the received image in an identical manner. The scanning process involved in the generation of region map 68a includes locating portions of the image where the intensity level of adjacent pixels changes by more than a predetermined amount, which amount will determine the resolution of the region map and the number of regions generated. In the preferred embodiment of the invention, region map generator 26 scans the gray scale image with a first, relatively high intensity threshold, to generate a series of regions that outline the larger regions of similar intensity in the gray scale image 64. Further scans are then performed, each with a lower intensity threshold than the previous scan, in order to generate more detailed regions within the previously generated regions. The number of scans performed depends on the amount of available bandwidth, as more detailed region maps with require more bandwidth for transmission, as is described below. The resulting region map 68a, as shown in FIG. 2, includes outlines of each of the regions generated in the scans by region map generator 26.

The original color image 60 is also input to colored region image generator 24, which generates a colored region image 70a, FIG. 2. Colored region image 70a is generated by first subtracting the intensity information from the original color image 60, step 72, which effectively eliminates the gray scale portion of the original color image 60. The color depth of the image is then reduced, step 74. By reducing the color depth of the image, adjacent similar colors or colors that vary only slightly in brightness or shade are rendered the same color in the colored region image 70a. Although it is not easily discerned from the figure, colored region image 70a is a version of the original color image 60 in which adjacent portions of similar colors are shown as one portion of the average color, as determined in step 74. The generation resolution of the region map generator 26 and the color region image generator is generally the same, such that regions defined in the region map coincide with the regions in the colored region image 70a.

Figure 4:
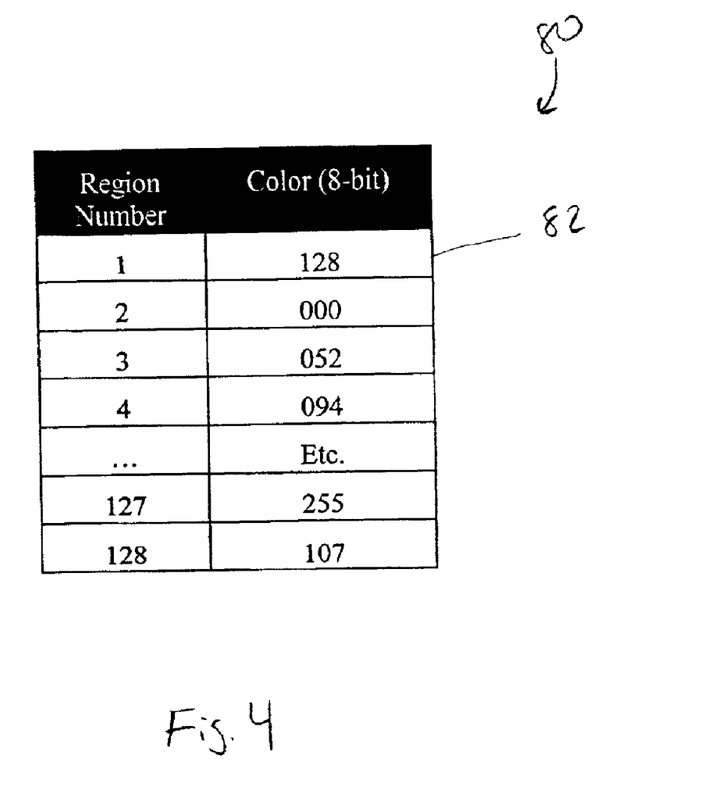
FIG. 4 is a diagram of a color region list in accordance with the present invention.

Both the region map 68a and the colored region image are input to region color linking device 28 which compares the colored region image 70a with the region map 68 and links each region in the region map 68a with the associated color in the colored region image 70a, step 76. As each region is linked to a color, the region is assigned an identification number and, preferably, an eight-bit color identification number, thus enabling the use of up to 256 colors. It will be understood, however, that more or less bits may be used to identify more or less colors, resulting in an increase or decrease, respectively, of the required transmission bandwidth. The region identification numbers and associated color identification numbers are input to color region list compiler 30, which compiles a list 80 of the region numbers and color numbers, such as is shown in FIG. 4. As shown in FIG. 4, the color region list 80 associates each region with a particular color value. Hence, as shown at 82, region number 1 is associated with color value 128 out of a possible 256 colors. Likewise, region number 2 is associated with color value 000, and so on. Although, in the example color region list shown in FIG. 4, only 128 regions are identified, it will be understood that, depending on the complexity of the images being transmitted and the amount of available bandwidth, the number of region may be considerably more than 128 or even less than 128.

After the color region list 80 is compiled, both the color region list 80, the gray scale image 64 and, optionally, an audio signal 86 are input to compressor 32 to be packed together and compressed, step 84. Compressor 32 may be a software or hardware device, such as a CODEC. However, since only the gray scale image, the color region list and an audio signal are to be transmitted, the compression demands are much less than in the case where color video is compressed and transmitted. As an example, a 640×480 pixel image using 8 bits to represent color information for each pixel would require nearly 2.5 million bits per frame, just for the color information. Representing this same image with 128 regions, each with an associated 8 bit color value, reduces the required data to 1024 bits per frame, for a (color only) compression ratio of 2400:1 (this, of course, excludes the gray scale image data transmission requirements, which are dependent on the compression scheme used). For a 1024-region transmission, the data rate is increased to 8192 bits per frame, or a (color only) compression ratio of 300:1. After the gray scale image, the color region list and the audio signal are compressed, step 84, the compressed signal is transmitted, step 88, to the reception device 14, as indicated by dashed line 90. The transmission of the compressed signal may take place over a typical telephone line, or may be a low bandwidth wireless transmission.

Referring now to FIG. 3, the operation of reception device 14 will be described. Upon reception of the transmitted compressed signal, step 90, the signal is input to decompressor 34, where it is decompressed and unpacked into the gray scale image 64 and the color region list 80 (and the audio signal, if present), step 92. Decompressor 34 may also be a software or hardware device, such as a CODEC, and operates in a similar, but opposite, manner as compressor 32.

Once the compressed signal is decompressed in decompressor 34, the gray scale image 64 is input to region map generator 36 and into image summer 40. Region map generator 36 identifies regions, step 94, in an identical manner as region map generator 26 to generate region map 68b. Both region map generators 26 and 36 are configured to generate regions at the same resolution and in the same order, resulting in a region map 68b which is identical to region map 68a, FIG. 2.

The color region list 80 is input to color assignment device 38, which also receives the region map 68b from the region map generator 36. Color assignment device 38, based on the region number information and associated color value information contained in the color region list 80, assigns the designated color value to its associated region, step 96, resulting in the generation of colored region image 70b, which is identical to color region image 70a. The color region image 70b is then input to image summer 40, step 98, where it is added to the gray scale image 64. This addition of the gray scale image to the color region image operates to raise the intensity of the colored region image to "normal" specifications. The resulting colored gray scale image 100 is then input to display device 42, such as a LCD display for viewing. While colored gray scale image 100 is not identical to original color image 60, it is sufficient for display on the typical small-size or low-resolution LCD display to be found in many portable devices, where the differences are less easily perceived.

Accordingly, the present invention provides a method and system for transmitting color video over low bandwidth transmission media. By processing the captured images and generating the color region list, only the gray scale image and the color region list need be transmitted to the receiver. The processing portions of the transmission device 12 and the reception device 14 are able to be included in a single chip configuration. In addition to lower bandwidth requirements, the system, by requiring that only the gray scale image and the color region list be compressed, enables the use of less expensive and less complex processing and compression/decompression devices.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimedd is:

1. A system for transmitting color images comprising:
   an image capture device for receiving at least one color image;
   a gray scale image generator for removing color data from said image to produce gray scale version of said image;
   a first region detection device for identifying a plurality of arbitrarily-shaped discrete regions of said image and generating a region map, wherein each of said plurality of discrete regions of said region map encompass a portion of said gray scale image having a particular common value;
   a color region list compiler for compiling a color region list associating each of said plurality of regions with a color value;
   a transmission device for transmitting said gray scale version of said image and said color region list;
   a reception device for receiving said gray scale version of said image and said color region list;
   a second region detection device for identifying said plurality of arbitrarily-shaped discrete regions of said image identified by said first region detection device and generating said region map; and
   a color assignment device which receives said color region list and assigns a color value to each of said plurality of regions in said region map, based on information in said color region list to generate a colored region image.

2. The system of claim 1 wherein said particular common value is one of a luminance value of the region and a textural value of the region.

3. The system of claim 2 further comprising a camera for inputting video images into said image capture device.

4. The system of claim 2 further comprising a compression device for receiving said gray scale version of said image and said color region list and generating a compressed signal for transmission to said reception device.

5. The system of claim 2 wherein, in a first iteration, said first and second region detection devices scan said gray scale image from a first point of said gray scale image to a second point of said gray scale image and generate said region map at a low resolution, and in further iterations, said first and second region detection devices scan each of said regions identified in a preceding iteration at successively higher resolutions, to identify further regions within said region map.

6. The system of claim 2 wherein each region of said region map includes a unique identification index and said color region list includes said unique identification indices and an associated color value for each region.

7. The system of claim 6 wherein said color value associated with each region comprises an average of color values included within each region.

8. The system of claim 2 further comprising a colored region image generator for generating a colored region image, said colored region image including said color values for each of said discrete regions.

9. The system of claim 8 further comprising a color region linking device for linking each of said color values in said colored region image with an associated discrete region in said region map, wherein each linked color region is input to said color region list compiler.

10. The system of claim 2 further comprising an image summer for combining said gray scale image and said colored region image to generate a final colored image; and
   a display device for receiving and displaying said final colored image.

11. A method of transmitting color images comprising:
   A. receiving at least one color image;
   B. removing color data from said image to produce a gray scale version of said image;
   C. identifying a plurality of arbitrarily-shaped discrete regions of said gray scale image and generating a region map, wherein each of said plurality of discrete regions of said region map encompass a portion of said gray scale image having a particular common value;
   D. determining a color value in each of said plurality of regions, based on color information in said color image;

E. compiling a color region list associating each of said plurality of regions with a color value;

F. transmitting said gray scale version of said image and said color region list;

G. receiving said gray scale version of said image and said color region list;

H. identifying said plurality of arbitrarily-shaped discrete regions of said gray scale image identified by said first region detection device and generating said region map; and I. assigning a color value to each of said plurality of regions in said region map, based on information in said color region list.

12. The method of claim 11 wherein said particular common value is one of a luminance value of the region and a textural value of the region.

13. The method of claim 12 further comprising, prior to step F, compressing said gray scale version of said image and said color region list to generate a compressed signal for transmission to said reception device.

14. The method of claim 13 wherein, in a first iteration, said first and second region detection devices scan said gray scale image from a first point of said gray scale image to a second point of said gray scale image and generate said region map at a low resolution, and in further iterations, said first and second region detection devices scan each of said regions identified in a preceding iteration at successively higher resolutions, to identify further regions within said region map.

15. The method of claim 12 wherein each region of said region map includes a unique identification index and said color region list includes said unique identification indices and an associated color value for each region.

16. The method of claim 15 wherein said color value associated with each region comprises an average of color values included within each region.

17. The method of claim 12 further comprising, prior to step D, generating a colored region image, said colored region image including said color values for each of said discrete regions.

18. The method of claim 17 further comprising, prior to step E, linking each of said color values in said colored region image with an associated discrete region in said region map, wherein each linked color region is input to said color region list compiler.

19. The method of claim 12 further comprising, after step I, combining said gray scale image and said colored region image to generate a final colored image; and displaying said final colored image.

20. A system for transmitting color images comprising:

an image capture device for receiving at least one color image;

a gray scale image generator for removing color data from said image to produce gray scale version of said image;

a first region detection device for identifying a plurality of arbitrarily-shaped discrete regions of said image and generating a region map, wherein each of said plurality of discrete regions of said region map encompass a portion of said gray scale image having a particular luminance value;

a color region list compiler for compiling a color region list associating each of said plurality of regions with a color value;

a transmission device for transmitting said gray scale version of said image and said color region list;

a reception device for receiving said gray scale version of said image and said color region list;

a second region detection device for identifying said plurality of arbitrarily-shaped discrete regions of said image identified by said first region detection device and generating said region map; and a color assignment device which receives said color region list and assigns a color value to each of said plurality of regions in said region map, based on information in said color region list to generate a colored region image.

21. A system for transmitting color images comprising:

an image capture device for receiving at least one color image;

a gray scale image generator for removing color data from said image to produce gray scale version of said image;

a first region detection device for identifying a plurality of arbitrarily-shaped discrete regions of said image and generating a region map, wherein each of said plurality of discrete regions of said region map encompass a portion of said gray scale image having a particular textural value;

a color region list compiler for compiling a color region list associating each of said plurality of regions with a color value;

a transmission device for transmitting said gray scale version of said image and said color region list;

a reception device for receiving said gray scale version of said image and said color region list;

a second region detection device for identifying said plurality of arbitrarily-shaped discrete regions of said image identified by said first region detection device and generating said region map; and a color assignment device which receives said color region list and assigns a color value to each of said plurality of regions in said region map, based on information in said color region list to generate a colored region image.

22. A system for transmitting color images comprising:

an image capture device for receiving at least one color image;

a gray scale image generator for removing color data from said image to produce gray scale version of said image;

a first region detection device for identifying a plurality of arbitrarily-shaped discrete regions of said image and generating a region map, wherein each of said plurality of discrete regions of said region map encompass a portion of said gray scale image having a particular common value;

a colored region image generator for generating a colored region image, said colored region image including color values for each of said discrete regions.

a color region list compiler for compiling a color region list associating each of said plurality of regions with said color values;

a transmission device for transmitting said gray scale version of said image and said color region list;

a reception device for receiving said gray scale version of said image and said color region list;

a second region detection device for identifying said plurality of arbitrarily-shaped discrete regions of said image identified by said first region detection device and generating said region map; and a color assignment device which receives said color region list and assigns a color value to each of said plurality of regions in said region map, based on information in said color region list to generate a colored region image.

23. The system of claim 22 wherein said particular common value is one of a luminance value of the region and a textural value of the region.

24. The system of claim 23 further comprising a camera for inputting video images into said image capture device.

25. The system of claim 23 further comprising a compression device for receiving said gray scale version of said image and said color region list and generating a compressed signal for transmission to said reception device.

26. The system of claim 23 wherein, in a first iteration, said first and second region detection devices scan said gray scale image from a first point of said gray scale image to a second point of said gray scale image and generate said region map at a low resolution, and in further iterations, said first and second region detection devices scan each of said regions identified in a preceding iteration at successively higher resolutions, to identify further regions within said region map.

27. The system of claim 23 wherein each region of said region map includes a unique identification index and said color region list includes said unique identification indices and an associated color value for each region.

28. The system of claim 27 wherein said color value associated with each region comprises an average of color values included within each region.

29. The system of claim 23 further comprising a color region linking device for linking each of said color values in said colored region image with an associated discrete region in said region map, wherein each linked color region is input to said color region list compiler.

30. The system of claim 23 further comprising an image summer for combining said gray scale image and said colored region image to generate a final colored image; and a display device for receiving and displaying said final colored image.

31. A method of transmitting color images comprising:

A. receiving at least one color image;

B. removing color data from said image to produce a gray scale version of said image;

C. identifying a plurality of arbitrarily-shaped discrete regions of said gray scale image and generating a region map, wherein each of said plurality of discrete regions of said region map encompass a portion of said gray scale image having a particular luminance value;

D. determining a color value in each of said plurality of regions, based on color information in said color image;

E. compiling a color region list associating each of said plurality of regions with a color value;

F. transmitting said gray scale version of said image and said color region list;

G. receiving said gray scale version of said image and said color region list;

H. identifying said plurality of arbitrarily-shaped discrete regions of said gray scale image identified by said first region detection device and generating said region map; and I. assigning a color value to each of said plurality of regions in said region map, based on information in said color region list.

* * * * *